UNITED STATES PATENT OFFICE.

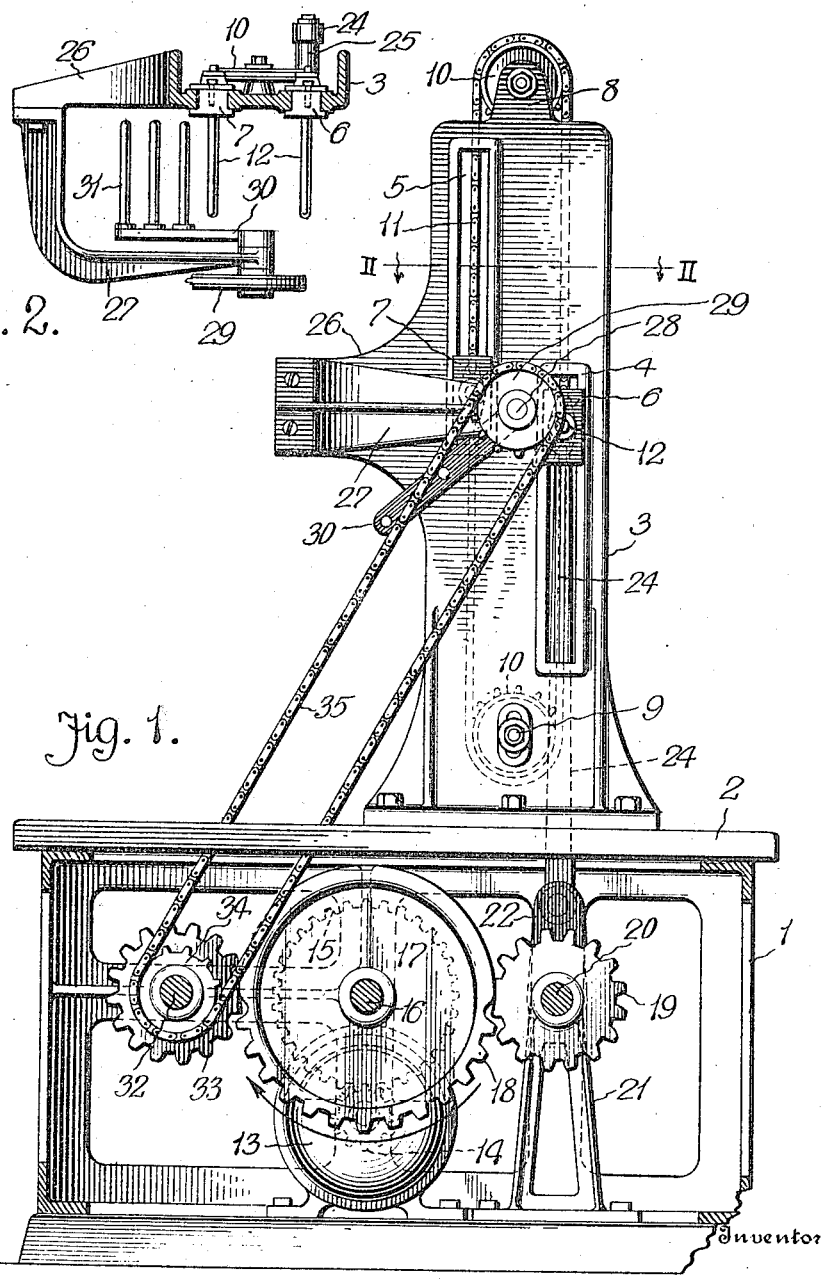

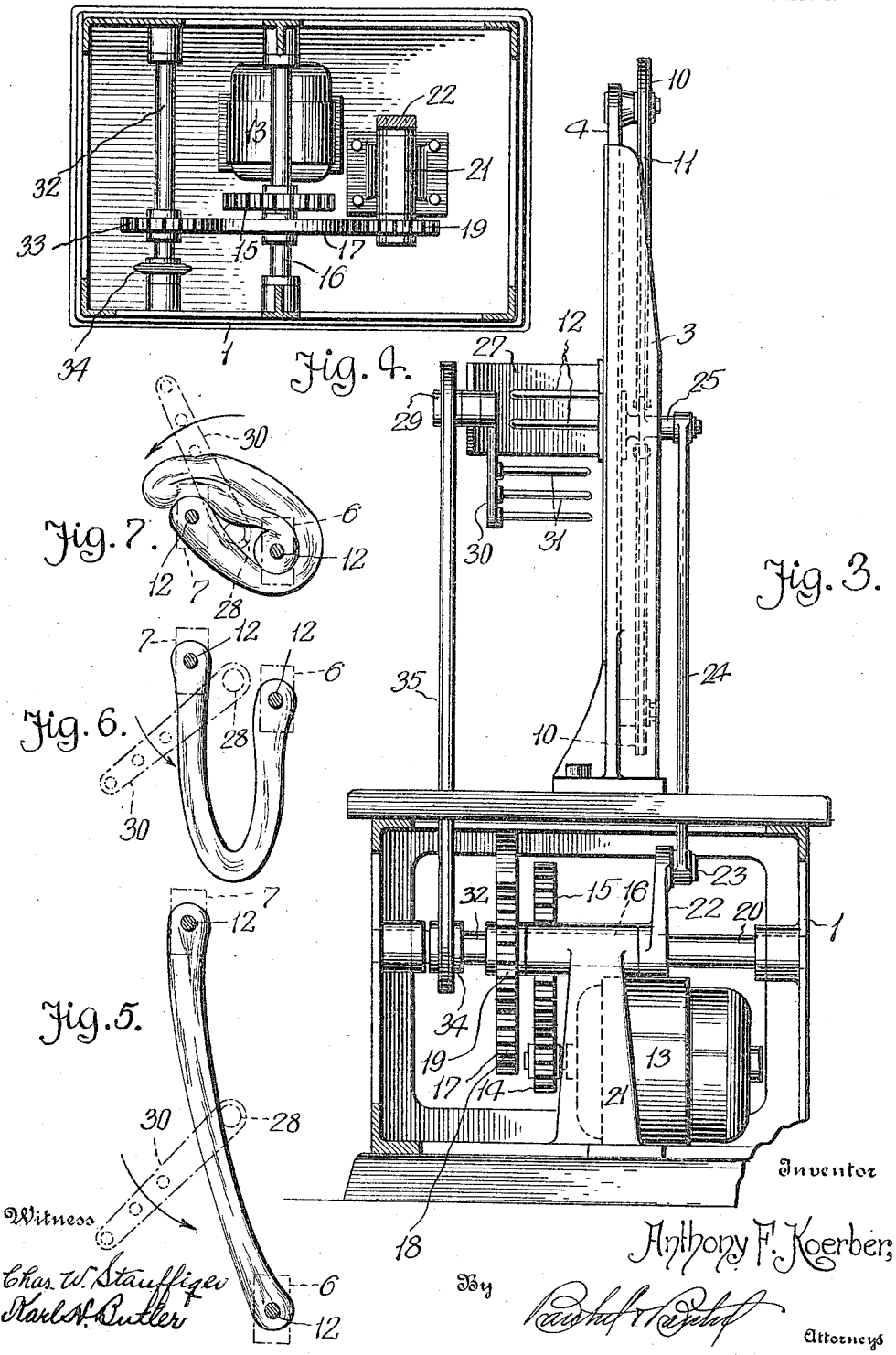

ANTHONY F. KOERBER, OF DETROIT, MICHIGAN.

CANDY-PULLING MACHINE.

1,282,866.  Specification of Letters Patent.  Patented Oct. 29, 1918.

Application filed February 21, 1918. Serial No. 218,392.

*To all whom it may concern:*

Be it known that I, ANTHONY F. KOERBER, a citizen of the United States of America, residing at Detroit, Michigan, in the county of Wayne and State of Michigan, have invented certain new and useful Improvements in Candy-Pulling Machines, of which the following is a specification, reference being had therein to the accompanying drawings.

This invention relates to a candy pulling machine, that may be used, for quickly, evenly, cleanly and efficiently pulling or working a batch of candy.

My invention aims to provide a novel machine embodying stretching or pulling elements that are reciprocable to and from each other and connected for movement in synchronism, in combination with a lapping or gathering element that places the batch of candy in position to be stretched or pulled by the first mentioned elements. The machine includes an operating mechanism that causes the stretching and gathering elements to be alternately actuated, the stretching elements remaining inactive while the batch of candy is lapped or gathered about said elements, and then the gathering element remains inactive while the stretching elements pull the lapped batch of candy, and this operation is continued until the candy is of desired color, texture and bulk.

My machine will be hereinafter described and then claimed and reference will now be had to the drawings, wherein—

Figure 1 is a side elevation of the machine, partly in section;

Fig. 2 is a horizontal sectional view taken on the lines II—II of Fig. 1;

Fig. 3 is an end view of the machine, partly broken away and partly in section;

Fig. 4 is a horizontal sectional view, on a smaller scale, of the lower portion of the machine;

Figs. 5 and 6 show the manipulation of a batch of candy by the stretching or pulling elements, and Fig. 7 shows the manipulation of the batch of candy by the lapping or gathering element.

In describing my invention by aid of the views above referred to, I desire to point out that the same are merely illustrative of an example whereby my invention may be put into practice, and I do not care to confine myself to the precise construction and arrangement of parts shown.

In the drawings, the reference numeral 1 generally denotes a boxlike framework that has a table top 2 and mounted on this table top is an upright 3 provided with vertically disposed slots or openings 4 and 5, for slide heads 6 and 7 respectively. The openings 4 and 5 are in parallel planes with the opening 5 adjacent the upper end of the upright 3 and the opening 4 adjacent the lower end thereof, said openings having ends thereof somewhat in overlapped relation so that the slide head 6 may closely approach a horizontal plane intermediate the ends of the upright 3.

The upper end of the upright 3 has a stationary bearing 8 and the lower end of said upright an adjustable bearing 9, and from these bearings are supported rotatable sprocket wheels 10 for sprocket chains 11, said chains having the ends thereof connected to the slide heads 6 and 7 so that said slide heads may be moved in synchronism and reciprocated to and from the central portion of the upright 3.

Extending outwardly from the slide heads 6 and 7 are arms 12, and it is on these arms that a batch of candy is placed to be manipulated.

In the framework 1 is an electric motor 13 having the armature shaft thereof provided with a small gear wheel 14, said small gear wheel meshing with a large gear wheel 15 on a rotatable shaft 16 suitably supported by the framework 1. Mounted on the shaft 16 is a wheel 17 having half of its periphery provided with gear teeth 18 adapted to perform work or transmit power while the remaining half of the wheel is inactive for power purposes. The gear teeth 18 correspond somewhat to a sector or segment rack and are adapted to mesh with a gear wheel 19 mounted on a shaft 20 journaled in a bearing 21 within the framework 1. One end of the shaft 20 has a crank 22 connected, as at 23, to the lower end of a pitman 24 that extends upwardly through the table top 2 and is connected, as at 25, to the slide head 6.

With the motor 13 in operation, it is apparent that the wheel 17 will intermittently revolve the shaft 20 and cause the slide head 6 to be reciprocated in the upright 3. Since the slide head 7 is connected to the slide head 6, these two heads will be shifted to and from each other.

The upright 3, intermediate the ends thereof, has a side extension 26, provided with a bracket 27 that has the ends thereof in parallelism with the upright 3. Journaled in the end of the bracket 27 is a shaft 28 and the outer end of said shaft has a sprocket wheel 29, while the inner end of said shaft has a crank 30 provided with a plurality of parallel arms 31. The arms 31 extend inwardly toward the upright 3 and constitute the lapping or gathering element of the machine, as will hereinafter appear.

Another rotatable shaft 32 is located within the framework 1 and provided with a gear wheel 33 adapted to be intermittently actuated by the wheel 17. On the shaft 32 is a sprocket wheel 34, and trained on the sprocket wheels 34 and 29 is an endless sprocket chain 35 that extends through the table top 2 and imparts movement to the crank 30.

Assuming that a batch of candy has been placed on the arms 12, and the motor placed in operation, the arms 12 will move away from each other to stretch or pull the batch of candy, as shown in Fig. 5, and then said arms will move toward each other so that the batch of candy will be looped or suspended from the arms 12, as shown in Fig. 6. The arms 12 now remain inactive while the arms 31 are swung about the arms 12, and in starting off, the arms 31 engage the suspended batch of candy and swings the looped or suspended end thereof upwardly over said arms, as shown in Fig. 7, thereby lapping or gathering the batch into a bulk that may be again stretched or pulled when the arms 12 are placed in operation.

It will be noted that during the operation of pulling the batch of candy that at no time does the arms 31 pass between the arms 12, but always around said arms so as to wrap the batch of candy thereon, and thus place the entire batch of the candy in position to be pulled when the arms 12 are separated.

What I claim is:—

In a candy pulling machine having pulling elements reciprocable to and from each other and a gathering element adapted to swing about said pulling elements when in proximity to each other, the combination of means including a gear wheel for actuating the pulling elements, means including a gear wheel for actuating the gathering element, and motor driven means between the gear wheels adapted to alternately mesh therewith to alternately actuate the pulling and gathering elements.

In testimony whereof I affix my signature in the presence of two witnesses.

ANTHONY F. KOERBER.

Witnesses:
KARL H. BUTLER,
ANNA M. DORR.

Copies of this patent may be obtained for five cents each, by addressing the "Commissioner of Patents, Washington, D. C."